Fig. I.

Nov. 25, 1958   D. E. ABELL   2,862,161
MOTOR CONTROL WITH INERTIA COMPENSATING SYSTEMS
Filed Jan. 6, 1956   7 Sheets-Sheet 3
Fig. 5.
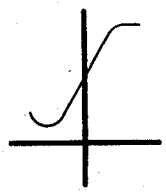
⟵⟶ IC
⟵ Pat
⟵ B
⟶ S
⟶ C
⟶ AH
Fig. 6.
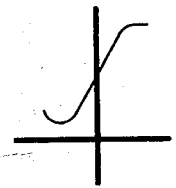
⟶ RMV
⟶ IR
⟵ TB
⟵ TP
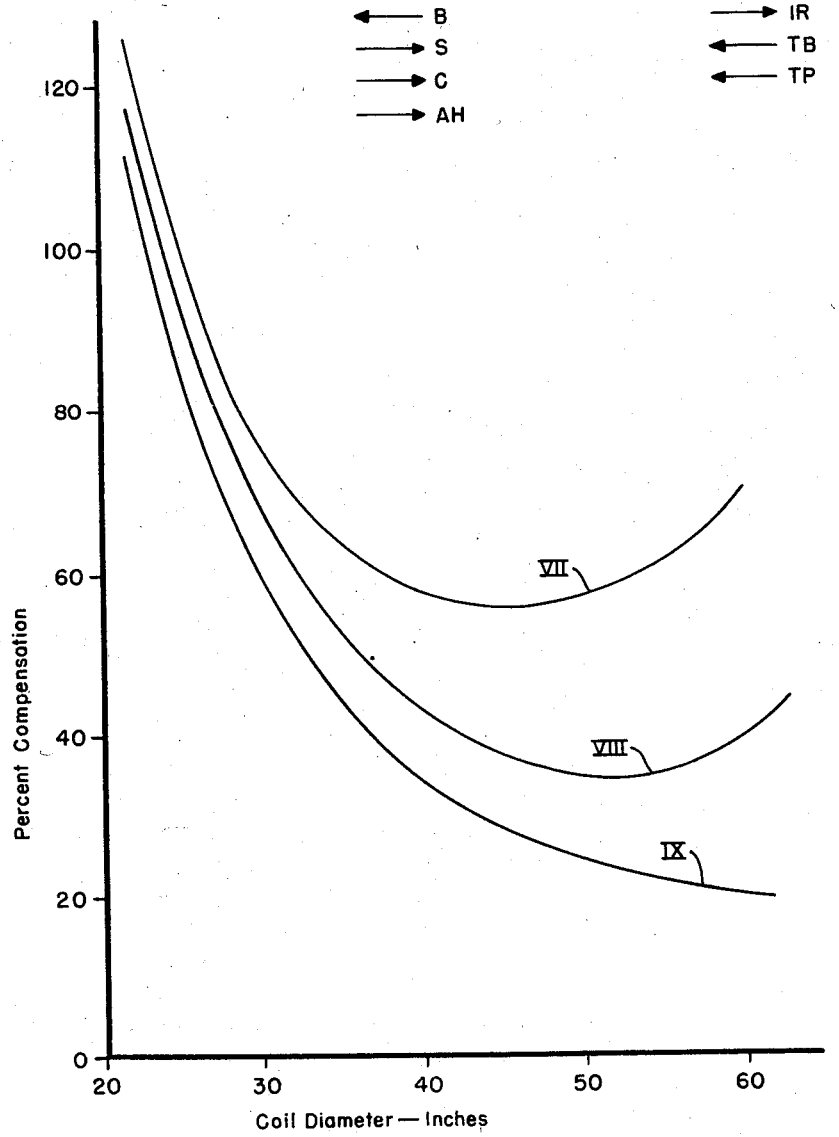
Fig. 4.

Nov. 25, 1958  D. E. ABELL  2,862,161
MOTOR CONTROL WITH INERTIA COMPENSATING SYSTEMS
Filed Jan. 6, 1956  7 Sheets-Sheet 6

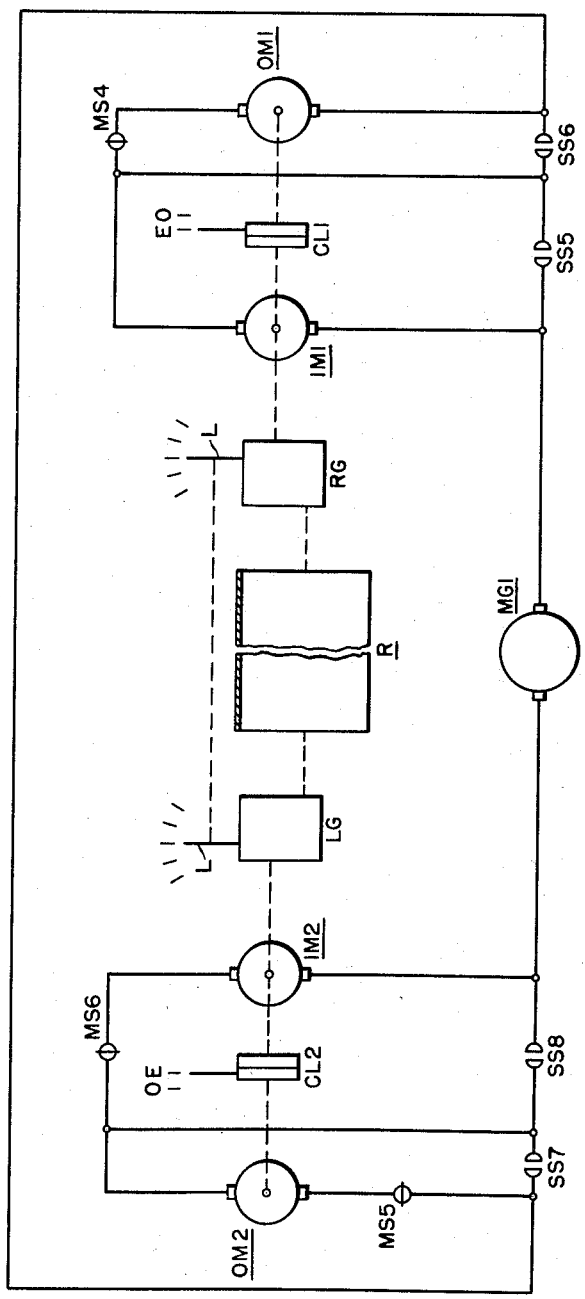
Fig. II.

United States Patent Office
2,862,161
Patented Nov. 25, 1958

2,862,161

MOTOR CONTROL WITH INERTIA COMPENSATING SYSTEMS

Donald E. Abell, Buffalo, N. Y., assignor to Westinghouse Electric Corporation, East Pittsburgh, Pa., a corporation of Pennsylvania Application January 6, 1956, Serial No. 557,748

26 Claims. (Cl. 318—6)

The inventions herein disclosed relate to electric control systems for controlling the operation of metal rolling mills and similar mills, and more particularly to systems of control for the winding equipment of such mills.

While the inventions herein disclosed are equally applicable either to the apparatus for operating an unwind reel or to apparatus for operating a windup reel, the disclosure hereinafter presented will, for purposes of simplification, be primarily directed to an electric system of control as utilized with the apparatus for operating an unwind reel.

The objects of this invention will become more readily apparent after a brief description of the main features of this invention and a brief description of the figures of the drawings, in which:

Figs. 2, 3 and 4 show some curves illustrating some of the results obtained with various combinations of the systems of control;

Figs. 5 and 6 show curves illustrating the characteristics of the magnetic amplifiers used in the systems of control;

Figure 7:
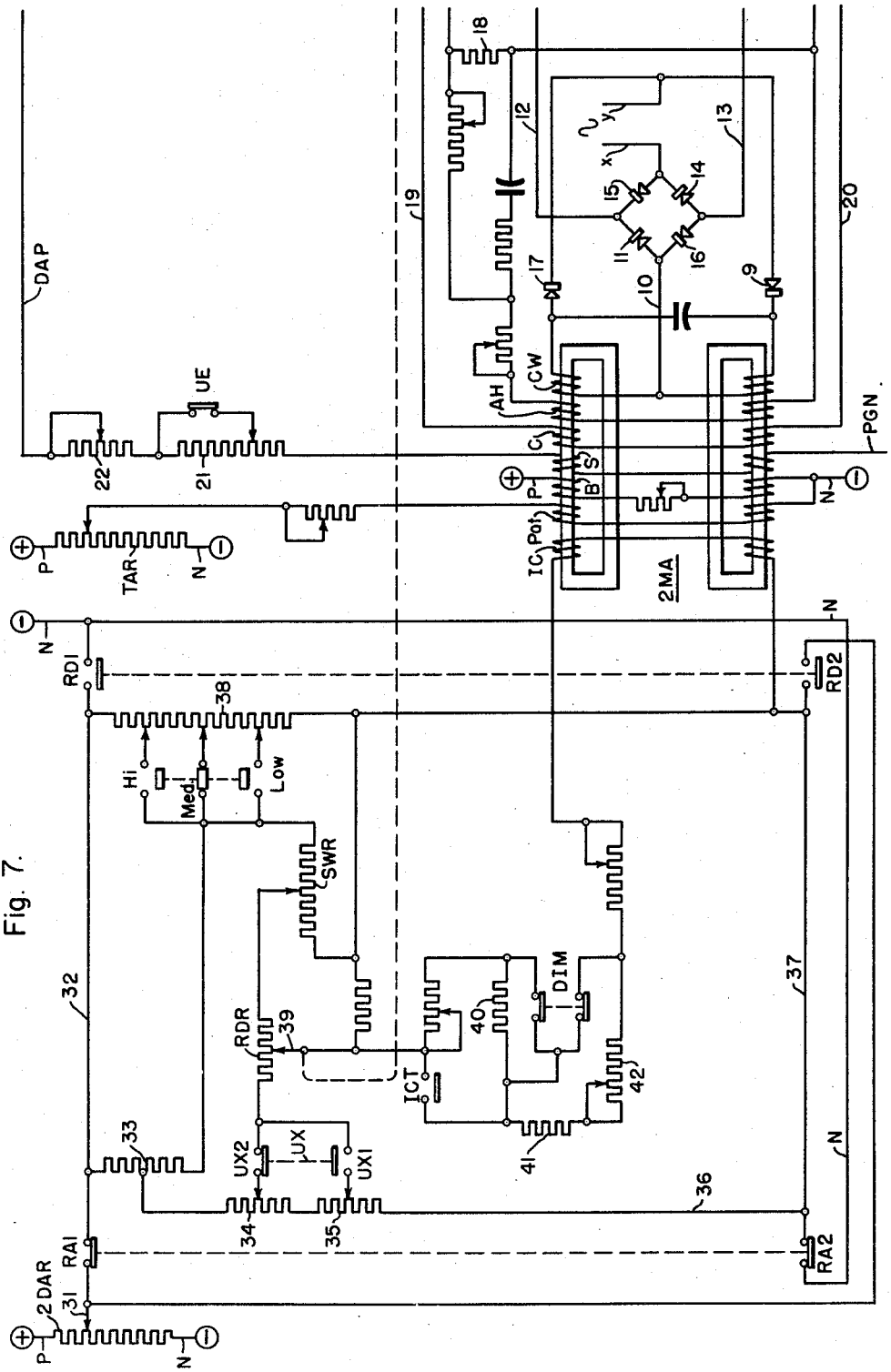
Figure 8:
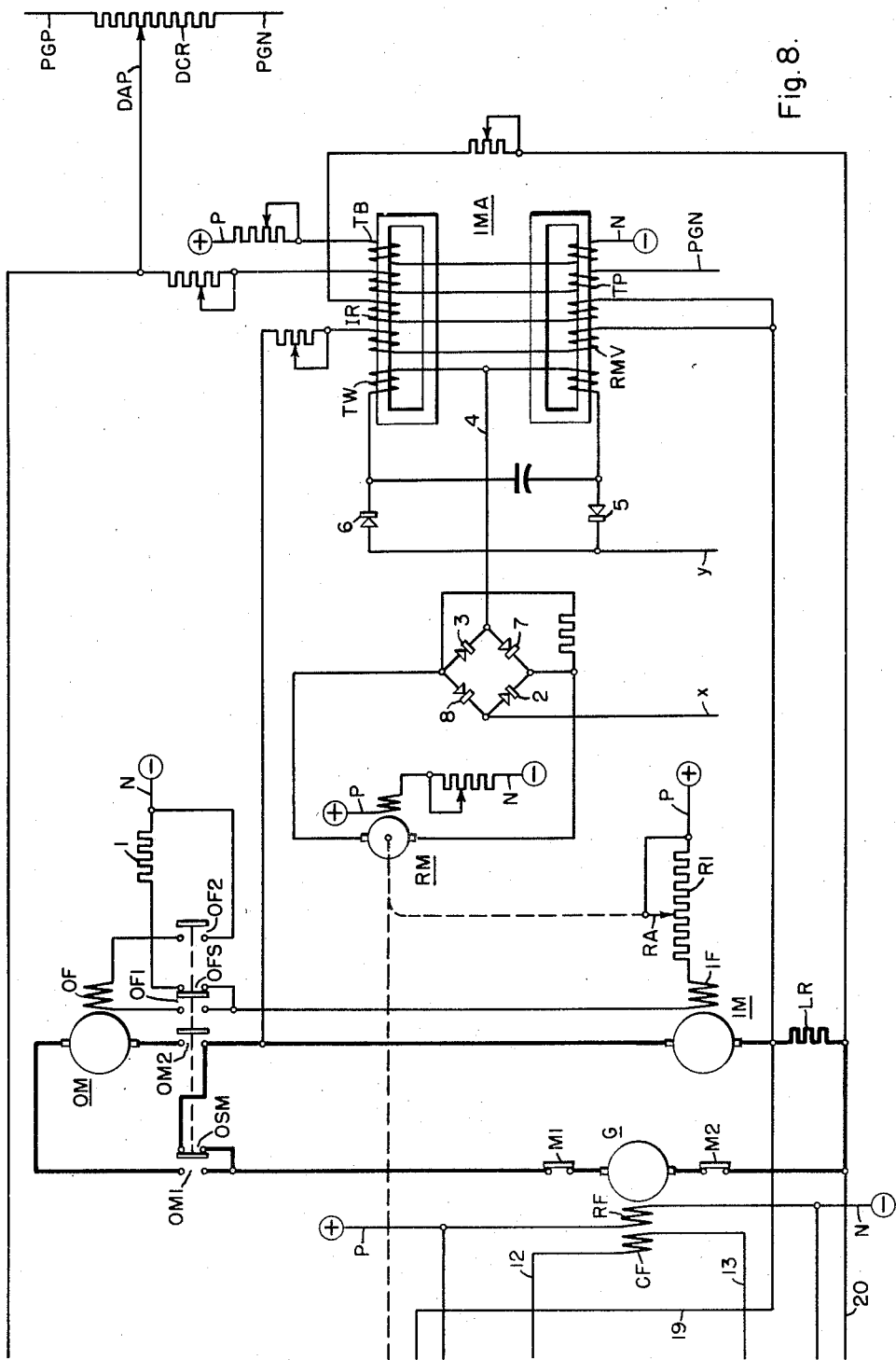
Figure 9:
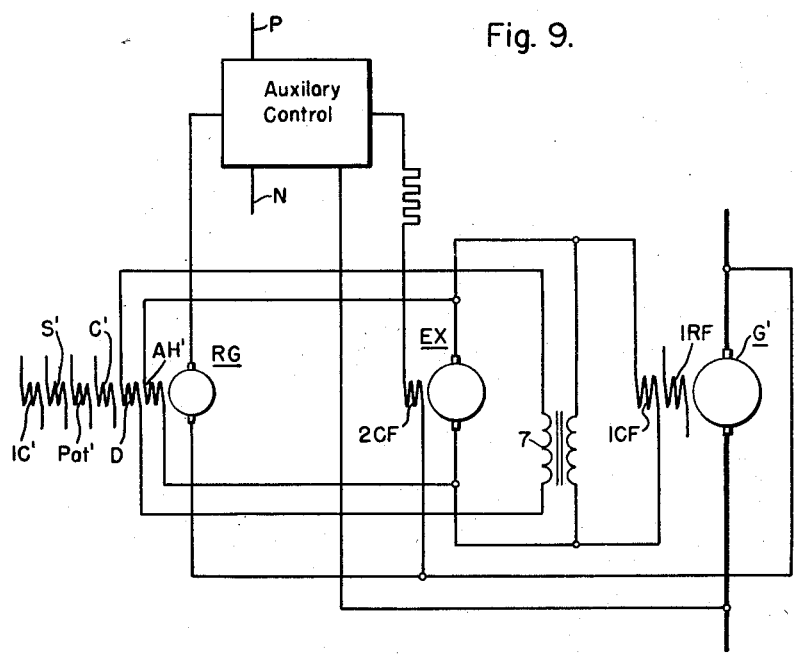
Figure 10:
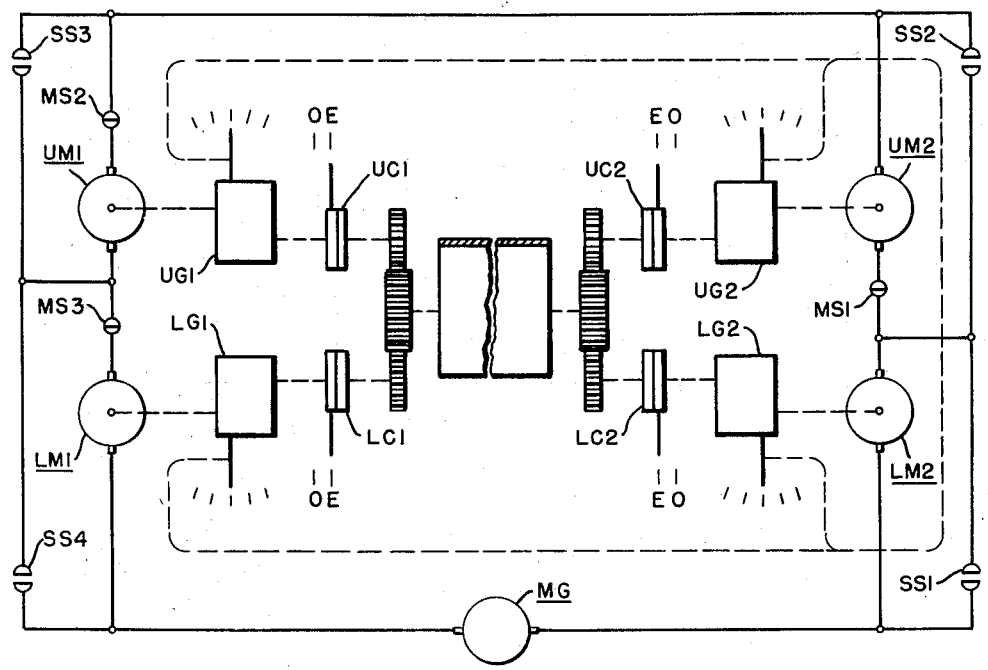

Figs. 7 and 8 together comprise a more detailed showing of the systems of control embodying the inventions herein disclosed;

Fig. 9 is a diagrammatic showing of a modification of this invention;

Fig. 10 is a schematic showing of a modification of the invention showing more than two motors for operating a winding reel; and Fig. 11 shows a modified arrangement of a four-motor drive.

Figure 1:
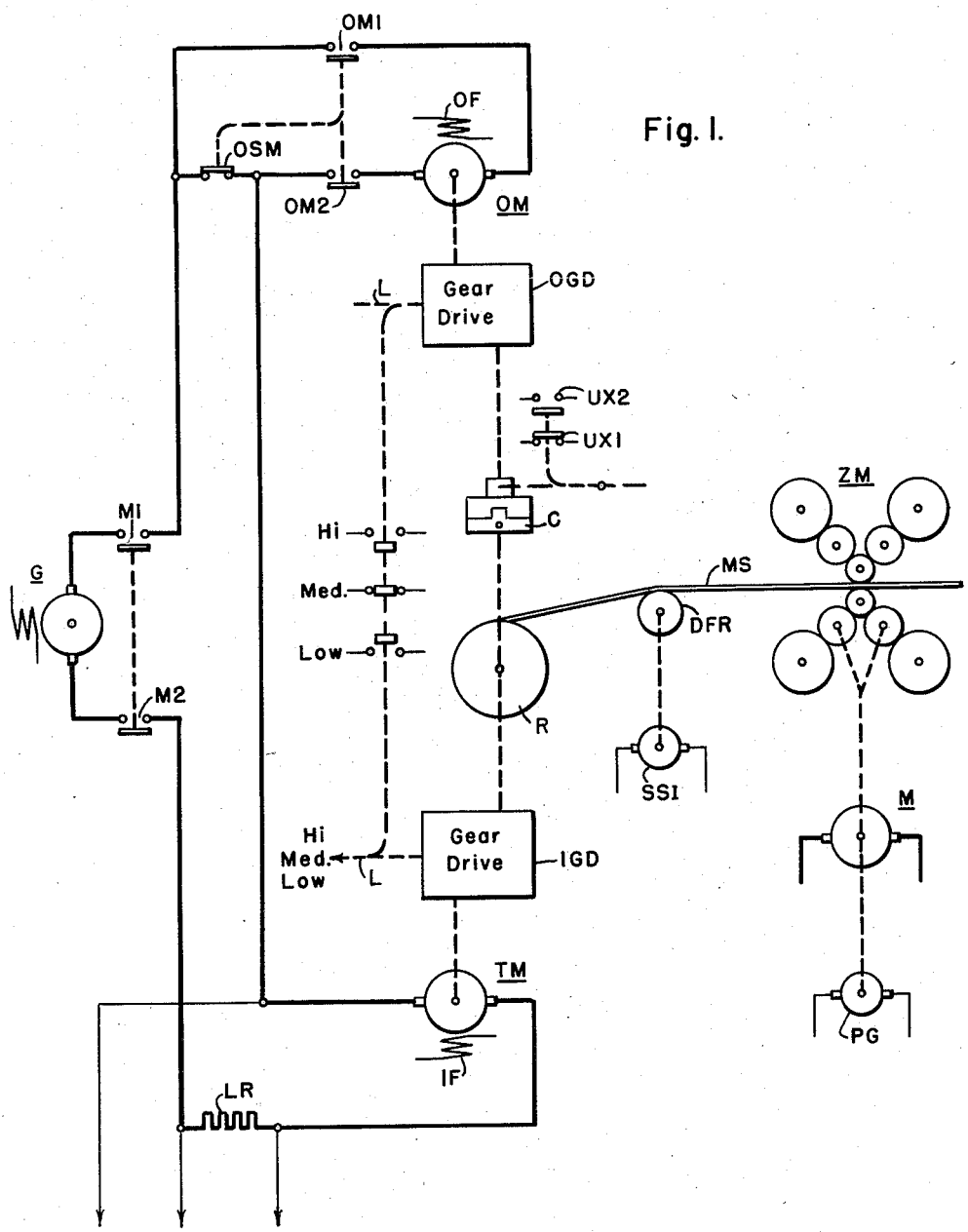
Figure 1 is a schematic showing of a mill and unwind apparatus and includes a diagrammatic showing of the main electric circuits.

Referring to Fig. 1, ZM represents a Sendzimer cold reduction mill driven by the mill motor M. While the mill shown is a reversing mill, wherein the metal strip MS moves from the unwind reel R over the deflector roll DFR through the mill onto a windup reel, not shown, and then back from the windup reel, now an unwind reel, through the mill back on the reel shown, the control is also well adapted to a non-reversing mill.

In the discussion to follow, the assumption will be that no reversing is contemplated and the material is only upwound from the reel shown, passes through the mill to a windup reel, not shown.

The reel R is mechanically coupled to be driven by the two motors shown. The outboard motor OM is coupled to the reel through the gear drive OGD and clutch C and the reel is also driven by the inboard motor IM through the gear drive IGD.

The arrangement shown in Fig. 1 is but one possible arrangement. For an actual installation as shown in Figs. 7 and 8 together, the outboard motor was clutched directly to the inboard motor with the inboard motor coupled directly to a reduction gear, the output shaft of which was coupled to the reel.

The arrangement may be visualized by considering one half, say the right half, of the drive shown in Fig. 11. In this showing, the outboard motor OM1 is clutched directly by clutch CL1 to the inboard motor IM1, and the inboard motor is coupled to the input shaft of the gear reduction RG, and the output shaft of the gear reduction is coupled directly to the reel R. The drive is thus accomplished by one gear reduction unit by two motors from one side of the mill.

Two motors give a fairly wide tension range, but where the same mill is at one time used for rolling non-ferrous foil and at another time heavy and thick ferrous metal, a very wide range of tension is required. This will be discussed later when a more detailed description of Figs. 10 and 11 is being made.

In actual practice a clutch may and usually is provided for the inboard motor and suitable bypass and isolation switches are provided for both motors, but for simplification of the disclosure of the inventions much equipment of an actual installation is left out, since many of the elements have nothing to do with an understanding of the inventions herein disclosed.

When the lever L for selecting the gear ratio is in the HI position, the gear ratio selected is 2.096/1; when in the MED position the gear ratio selected is 3.145/1; and when in LOW position the gear ratio selected is 6.298/1. These gear ratios mentioned have reference to a particular mill application and provide metal strip speeds of 0–3000, 0–2000, and 0–1000 feet per minute. The gear ratios stated are merely illustrative. For other mills the gear ratios found most desirable will vary likely be different.

In this disclosure when reference is made to the motors OM and IM as having a driving connection with the reel, it only means the motors apply a torque to the reel shaft. The direction of the torque of the motors on the reel, except when threading the metal strip through the mill, is such as to provide a hold-back tension on the metal strip. That is, normally the motors are driven by the reel R and feed back energy to the generator G.

Assuming both motors are mechanically coupled to the reel, metal strip is moving from reel R to the mill ZM, and that both motors are electrically connected to the armature of the generator G, and that the generator and both motors are properly excited to provide the polarities indicated, then current flows from the right-hand armature terminal of motor OM through the contacts OM1 of the outboard motor main line contactor, the contacts M1 of the main line contactor of the generator G, the generator armature against the generator voltage, the contacts M2 of the main line contactor for the generator G, the load current indicating impedance, or resistor LR, the armature of the inboard motor IM, the contacts OM2 of the outboard main line contactor, through the armature of motor OM back to the righthand armature terminal.

When an emergency arises in connection with the outboard motor, or if for any reason, the outboard motor is to be taken off the line, the main line contactor for the outboard motor is operated opening the contacts OM1 and OM2 and immediately thereafter the contacts OSM of the outboard motor bypass contactor are closed. The inboard motor IM alone now returns electric energy to the generator G.

Under the conditions recited the armature of the outboard motor is driven from the reel through the clutch and the gear drive. The clutch C is under these conditions left closed. Only if the outboard motor is to be out of service for a long time is the clutch C opened to thus also isolate motor OM mechanically from the reel drive.

One purpose of the inboard and outboard motor arrangement is not so much for emergency operation as it is to double the tension range. Thus, for rolling light strip the inboard motor alone is used to produce strip tension, which, for the same load current magnitude, is only one-half of the total with both motors. Thus, a system with a 10/1 current regulation range produces a 20/1 tension range by disconnecting one motor.

Occasionally in emergencies, the outboard motor will be used alone to drive the reel and therefore must accelerate the rotor mass of the inboard motor also.

Recent mill developments, particularly in the nonferrous metal industry, have stressed the importance of an inertia compensating circuit that can track the increase and decrease of coil diameter and make necessary changes in the required compensation.

From the general description above made of the equipment involved and the manner in which it is used, and the fact that the description is directed merely to an example of many similar applications, it is apparent that such compensation is complicated by the great number of gear ratios and armature combinations which are being used to obtain the vast tension ranges desired. To compensate for coil diameter only thus falls far short of the compensation needed. Compensation is needed for: (1) coil diameter changes, (2) gear ratio changes, (3) strip width, (4) number of motor armatures mechanically coupled to the reel, (5) number of armatures mechanically and electrically coupled to the reel drive, (6) the kind of metal being rolled, and (7) windage changes for the various speeds of operation used for the various mechanical and electrical arrangements selected.

One broad object of this invention is to provide the proper amount of inertia compensation to a current regulated winding reel drive regardless of the diameter of the coil, the gear ratio between the motor and the coiler mandrel, the width of the strip, the number of motor armatures mechanically coupled to the coiler mandrel, and the number of motors electrically connected and mechanically coupled for supplying power to the coiler mandrel.

It is also a broad object of this invention to provide the proper amount of inertia compensation to a current regulated winding reel drive regardless of the coil diameter and any one of the other factors in such a drive that also affect the inertia of the system.

The objects recited are merely illustrative. Other objects and advantages of this invention will become more apparent from the disclosure as a whole and from the claims hereto appended.

The main function of the regulating control for the reel is to hold constant tension on the metal strip between the unwind reel and the mill ZM. To hold constant tension on the strip requires that the reel motor, as for example the inboard motor IM, regenerate power to the supply generator G at a rate that is proportional to the speed of the mill since the unwind reel is being pulled by the metal strip MS as it passes through the mill ZM. The power required to hold constant tension is proportional to the strip tension and the strip speed. This requirement is accomplished by regulating the CEMF in proportion to mill speed and by regulating the motor current in proportion to the tension desired. Since motor power is proportional to the product of its CEMF and current, such action effectively regulates for constant strip tension.

The CEMF is regulated by adjusting the field strengths of the field windings OF and IF of motors OM and IM, respectively. For the particular arrangement shown in Figs. 7 and 8 together, some emergency or other reason required the operation to closed position of the emergency switch UE and also the operation of switches OM1, OSM, OM2, OF1, OFS, and OF2 to the positions shown. With these switches operated as mentioned, the outboard motor is eliminated electrically from the motor generator loop circuit but remains mechanically coupled to the reel R, since clutch C remains closed. The field strength of field winding IF for the inboard motor IM is the only one adjusted for CEMF.

Maximum excitation at 250 volts is applied when the rheostat arm RA is at the extreme left, to which position it is automatically reset at start. The CEMF regulation is accomplished by the magnetic amplifier IMA, the output of which operates the regulating motor RM, which motor drives the motor operated rheostats R1 and RDR.

The output of the pilot generator, represented by buses PGP and PGN, is applied across the draft compensation rheostat DCR and the pattern winding TP is, through draft adjustment arm DAP, connected across a selected portion of rheostat DCR. The coil RMV, responsive to the counter electromotive force of the inboard reel motor, is adjusted to match the draft adjusted pilot generator voltage. In short, the effect of windings TP and RMV match each other. This is shown in Fig. 6.

Since the motor IM is regenerating power, the armature current is reversed. Thus, the IR signal is reversed, or aiding the voltage field, that is aiding winding RMV, giving a signal proportional to CEMF. As the metal is taken off the mandrel the coil gets smaller, the speed of motor IM is increased and motor RM is operated to place more and more resistance in the field circuit for the field winding IF so that the CEMF is maintained proportional to mill speed.

The field circuit for field winding IF may be traced from positive terminal P through the rheostat R1, field winding IF, contacts OFS, resistor 1 and the negative terminal N. Resistor R1 has the same resistance value as field winding OF of the outboard motor. If switch OF1 had been closed to include the field winding OF, the function of winding RMV would not have been materially altered.

The magnetic amplifier IMA has the bias windings TB and the main, or output, windings TW. When X is positive, the CEMF control current flows from conductor X through rectifier 2, the armature of the rheostat operating motor RM, the rectifier 3, conductor 4, the lower main winding TW, and rectifier 5 to conductor Y. When conductor Y is positive, the current flows through rectifier 6, the upper main winding TW, conductor 4, rectifier 7, the armature of motor RM, the rectifier 8 to line X.

As above pointed out to maintain constant tension the reel motor armature current must also be regulated. This is accomplished through the output of the magnetic amplifier 2MA acting on the forward field winding, that is, the control field CF of the generator G.

The circuit for changing the excitation of the control field winding may be traced from the alternating current supply conductors X and Y. When X is positive, current flows from this conductor, through rectifier 9, the lower main winding CW, conductor 10, rectifier 11, conductor 12, control field winding CF of the generator G, conductor 13, rectifier 14 to the conductor Y. When conductor Y is positive, the current flows from conductor Y through rectifier 15, conductor 12, field winding CF, conductor 13, rectifier 16, conductor 10, the upper main winding CW, and rectifier 17 to conductor X.

The magnetic amplifier 2MA has five control windings namely an anti-hunt winding AH, a control winding C responsive to the load current in the motor generator loop circuit, a speed reference winding S, a bias winding B, a pattern winding Pat and an inertia compensating winding IC.

The anti-hunt winding AH is interconnected with the suitable adjustable resistors and a resistor and capacitor combination across the resistor 18 connected in parallel to the generator reverse field RF across the leads P and N.

The control winding C through conductors 19 and 20 is connected across the load resistor LR and thus provides a signal as a function of motor load current.

The basic speed signal winding S responsive to mill speed is connected in series with the resistor with the resistor sections 21 and 22 across the conductors DAP and PGN. The switch UE is an emergency switch that is closed when the outboard motor is electrically disconnected from the loop circuit. The closure of this switch recalibrates the effect of winding S for such change in operation. Of course, when both motors supply power to the reel, switch UE is open. Further, since winding S is connected to conductor DAP, its effect is made a function of the draft adjustment at rheostat DCR.

The bias windings B and the pattern windings Pat adjust the point of operation of the magnetic amplifier. The winding B provides a fixed adjusted effect whereas the windings Pat are connected across the tension adjusting rheostat TAR. The effect of windings Pat is thus changed with the tension desired.

The effects of the control windings for the magnetic amplifier 2MA are indicated in Fig. 5. From Fig. 5, it will be apparent that the effect of the inertia compensation winding IC is an important one and may vary a sufficient magnitude to cause the magnetic amplifier to operate over its entire output range.

The circuits for effecting the excitation of this IC winding, when a magnetic amplifier regulator is used, or the excitation of the similar winding IC' on a rotating regulator, when such rotating regulator is used, include the main features of this invention.

The circuits include means for effecting a compensation for each of the factors affecting the inertia and may be used in their entirety or in part depending upon whether different gear ratios are used, different armature combinations are used, or if strip width adjustments are necessary.

Figure 2:
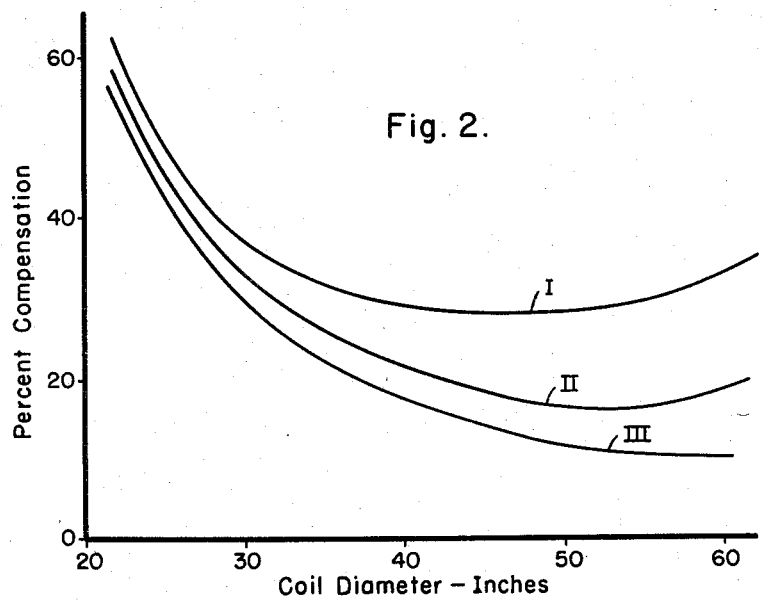
Figure 3:
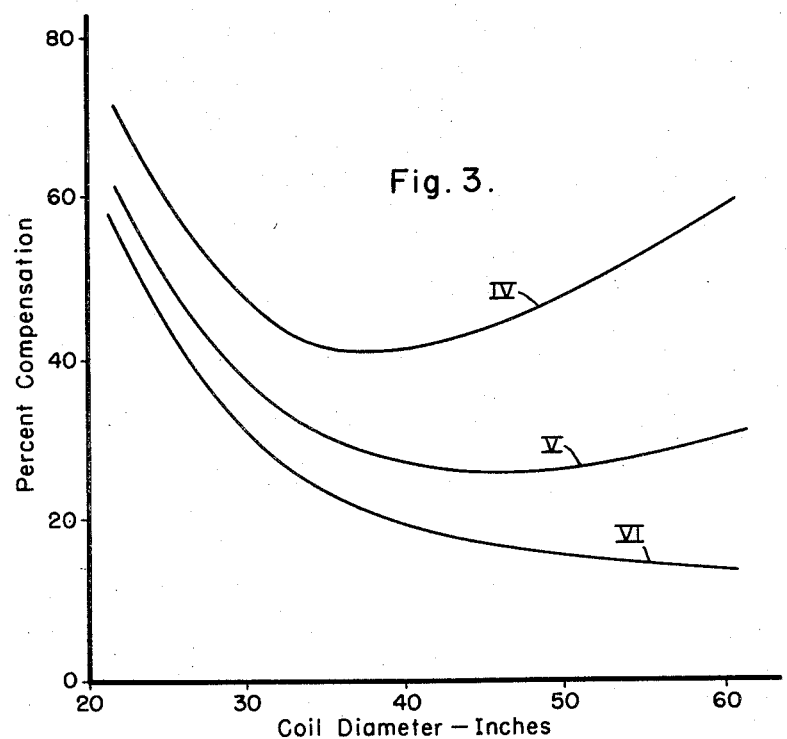

Figures 2, 3 and 4 show curves showing nine conditions of compensation found necessary on a particular mill application. The conditions are all plotted for one strip width.

The nine conditions are designated by the following table:

| Condition | Gear Ratios | Driving Motors | Connected Armatures |
|---|---|---|---|
| I | 2.096/1 | 2 | 2 |
| II | 3.145/1 | 2 | 2 |
| III | 2.096/1 | 2 | 1 |
| IV | 2.096/1 | 1 | 1 |
| V | 3.145/1 | 1 | 1 |
| VI | 6.3/1 | 1 | 1 |
| VII | 2.096/1 | 1 | 2 |
| VIII | 3.145/1 | 1 | 2 |
| IX | 6.3/1 | 1 | 2 |

The circuit includes a second draft compensating rheostat, or potentiometer, 2DAR and the tap 31 is adjusted for the draft desired. Since the reel is in this application used only to unwind strip material, the reel acceleration contacts RA1 and RA2 are closed with the reel deceleration contactors RD1 and RD2 open. With tap 31 adjusted for the desired draft and contacts RA1 and RA2 closed, a circuit is established from the positive terminal P, a portion of potentiometer 2DAR, tap 31, contacts RA1, conductor 32, adjustable resistor sections 33, and potentiometers 34 and 35 to conductors 36 and 37, contacts RA2 to the negative conductor N.

Since conductors 32 and 37 are energized, the gear ratio adjusting potentiometer 38, being connected across conductors 32 and 37, is energized. There are three gear ratio adjusting contacts HI, MED, and LOW associated with this potentiometer 38. If more or fewer gear ratios are necessary, additional resistor sections and contacts can be added or subtracted as the case may require.

With respect to the control winding IC, the strip width adjusting rheostat SWR is connected in series with the gear ratio control contactors across the potentiometer. This essentially represents the maximum coil diameter or final setting of the compensation circuit.

The reel diameter rheostat RDR is ganged in operation with the motor operated rheostat R1 which is part of the motor field CEMF regulator. See Fig. 8. The motor operated rheostat R1 varies the flux of the motor field windings in proportion to reel diameter in order to maintain constant tension on the strip.

For the particular arrangement of armatures as shown in Figs. 1 and 8, it is apparent that the inboard motor only supplies power to the reel. To compensate for this in the control, the drive-inboard-motor contactor DIM is closed as shown in Fig. 7

Since the outboard motor is coupled to the mandrel but isolated electrically, the UX contactor is operated to the up position to open contacts UX1 and close UX2 thus effecting a compensation as a function of the number of armatures, namely two, coupled to the drive.

Therefore, at full reel, the coil diameter rheostat arm 39, coupled to the armature of motor RM, will be at the extreme right on rheostat RDR. This rheostat RDR has a relatively high resistance, and therefore the source resistance through the strip width rheostat SWR appears low in comparison with the resistance through the reel diameter rheostat and the resistance determined by the resistance selected by the armature connected contactor UX. Thus, under the conditions mentioned, the strip with rheostat SWR and the gear ratio selector have a much greater effect on the compensation than does the connected armature selector UX.

Similarly, when the reel diameter is at a minimum, the strip width rheostat SWR has almost no effect on the compensation. At this point, the compensation is a function of the fixed $WR^2$ of the system. The predominant part of this is the motor armatures. However, the mandrel $WR^2$ reflected through the gear ratio changes the constant $WR^2$ with changes in gear ratio. This is accomplished by the tapped resistor 33 connected between the reversing bus 32 and the gear ratio selector contactors. The connected armature selector, represented by contactor UX and the resistors 34 and 35, is tapped on this resistor 33 in such manner as to produce this relatively small change in constant $WR^2$.

When only one armature is supplying power to the reel, the inertia compensation must be increased substantially. This is accomplished by contactor DIM which when actuated, as shown, shunts the resistors 40, 41 and 42 normally in series with windings IC when both motors are supplying power to the reel.

The inventions are not limited to the use of a magnetic amplifier regulator but may be applied to rotating regulators. This is particularly true when relatively large machines are involved requiring two-stage amplifications. In such case the second stage may be a rotating regulator or both stages may involve rotating regulators as shown in Fig. 9. In this Fig. 9, G' represents the main generator having the reversing field winding 1RF and the controlled field winding 1CF. The controlled field winding 1CF is connected in a loop circuit with the armatures of the exciter Ex. The output of the exciter is in turn controlled by the output of the rotating regulator RG.

The controlled field winding 2CF of exciter Ex is, through the auxiliary control, connected in a loop circuit with the armature of the rotating regulator RG. The auxiliary control modifies the excitation of field winding 2CF somewhat in dependence of the voltage of generator G' but mainly the output of the rotating regulator RG determines the excitation of field winding 2CF.

The rotating regulator has, associated with it, an anti-hunt field winding AH' connected across the armature of the exciter, a damper winding D energized from the secondary of the transformer 7 to thus dampen the voltage fluctuations as a function of the rate of change of the excitation of field winding 1CF, a load current responsive winding C', a pattern winding Pat', a mill speed responsive winding S', and an inertia compensating winding IC'. The ultimate control effects of these windings are substantially the same as the corresponding windings on magnetic amplifier 2MA.

While only two motors have been shown with the control for providing hold-back tension on the material being unwound from a reel, many mills are designed to roll metal varying from relatively narrow foil of nonferrous metals to relatively thick and wide ferrous metals.

The tension requirements may thus vary from a few hundred pounds to seventy thousand pounds or more. The number of motors that need be used for each case is different, and the gear ratios employed may thus vary over a considerable range. This is illustrated in Figs. 10 and 11 where four motors are shown.

In Fig. 10, all four motors LM1, LM2, UM1 and UM2 may be electrically connected to the supply represented by the main generator MG when all the main switches MS1, MS2 and MS3 are closed, as shown, and all the shunting switches SS1, SS2, SS3 and SS4 are open, as shown.

By a proper manipulation of the switches SS1, SS2, SS3, SS4, MS1, MS2, and MS3, any one motor, any two motors, any three motors, or all four motors may be electrically connected to the supply. The switches, in actual practice, will be so interlocked that the main generator MG cannot be shorted.

Further, by the use of the various gear transmissions and the ganged shift mechanisms shown, the gear ratio most desirable for each case may be selected. Further, each of the motors not electrically connected to the supply may be mechanically decoupled by appropriate operation of any one, any two, or any three of the clutches LC1, LC2, UC1 and UC2.

The control apparatus of this invention is well adapted to properly control the operation of the dynamoelectric machines shown in Fig. 10.

In Fig. 11, the arrangement is such that only one transmission gear, as RG, is used for the right half of the drive and one transmission, as LG, is used for the left half of the drive. The transmissions are also ganged as shown. Only one clutch CL1 is needed to couple the outboard motor OM1 to the inboard motor 1M1.

At the left, the outboard motor OM2 is coupled to the inboard motor 1M2 by the clutch CL2. With the arrangement of Fig. 11, only the outboard motors, i. e. one, or the other, or both, may be mechanically decoupled from the reel R.

By a suitable manipulation of switches SS5, CC6, SS7, SS8, MS4, MS5 and MS6, any one, any two, or any three motors may be shunted out of the circuit including generator MG1.

While only two applications and modifications of this invention have herein been disclosed, it is understood that the inventions are capable or various adapations and that other changes and modifications may be made which all come within the scope of the inventions herein set forth.

I claim as my invention:

1. In an electric control system for direct current dynamoelectric machines operative with a load device, in combination, a direct current generator having a field winding the excitation of which is to be controlled, a direct current motor connected in a loop circuit with the generator and having a field winding the excitation of which is to be controlled, a voltage regulating device having an output voltage which controls the excitation of the generator field winding, said motor being coupled to said load device the speed of which varies from a given relatively low speed to a higher speed, first control means for decreasing the excitation of the motor field winding with an increase in motor speed which will tend to increase the motor armature current, a control winding for changing the output of the voltage regulating device, second control means responsive to the increase in motor armature current and acting on said control winding for increasing the voltage output of the voltage regulating device to increase the counter-voltage of the generator to thus hold the motor armature current substantially constant to thus hold the power generated by the motor substantially constant.

2. In an electric control system for direct current dynamoelectric machines operative with a rotating load, in combination, a direct current generator having a field winding the excitation of which is to be controlled, a direct current motor connected in a loop circuit with the generator and having a field winding the excitation of which is to be controlled, a voltage regulating device the output voltage of which controls the excitation of the generator field winding, said motor being coupled to said rotating load the speed of which, during normal use, varies from a selected relatively low value to a higher value and whose weight, during such normal use, varies from a selected high value to some other selected lower value, first excitation control means for decreasing the excitation of the motor field winding with an increase in motor speed which will thereby increase the motor armature current, a first control winding for the voltage regulating device and a second control winding for the voltage regulating device, second excitation control means for controlling the excitation of the first control winding as a function of said increase of the motor armature current to effect an increase in the voltage output of the voltage regulating device and to effect an increase in the counter-voltage of the generator sufficient to hold the power generated by the motor substantially constant, and control means for exciting the second control winding to compensate for the change in inertia of the load.

3. In an electric system of control for direct current dynamoelectric machines, in combination, a direct current generator having a field winding the excitation of which is to be controlled, a direct current motor connected in a loop circuit with the generator and having a field winding the excitation of which is to be controlled, a voltage regulating device the output voltage of which controls the excitation of the generator field winding, said motor being coupled to an overhauling rotating load the speed of which, during normal use, varies from a selected relatively low value to a selected higher value and whose weight, during such normal use, varies from a selected high value to a selected lower value, means for decreasing the excitation of the motor field winding with an increase in motor speed as a function of motor armature current and motor terminal voltage, a first control winding for the voltage regulating device, responsive to motor armature current, for increasing the output voltage of the regulating device to thus increase the counter-voltage of the generator to maintain the motor armature current constant to thus keep the power generated by the motor substantially constant, an inertia compensating control winding for the voltage regulating device, said inertia compensating control winding being energized as a function of the changes in field excitation of the motor field winding.

4. In a voltage control system operative with a rotating load mechanism having a $WR^2$ value which changes and including a speed ratio device for providing a plurality of speed ratios, in combination, a generator having a field winding the excitation of which is to be controlled, motor means coupled to said mechanism for controlling the rotation of said mechanism, said motor means being energized by said generator, voltage output means connected to the generator field winding, and control means operatively connected to said rotating mechanism for changing the voltage output of said voltage output means to compensate for the speed ratio selected between the motor means and said mechanism and for at least one of a predetermined number of factors also changing the $WR^2$ value of the system comprising the motor means and said mechanism coupled thereto.

5. In a voltage control system operative with a rotatable mechanical load which during normal operation varies its rotatable mass from a given relatively large value to a relatively small value and which varies its speed of rotation from a relatively low value to a considerably higher value, in combination, a generator having a field winding the excitation of which is to be controlled, a pair of motors, first control means for selectively electrically connecting at least one of said motors in series with said generator, coupling control means for selectively mechanically coupling at least one of said motors to the load, speed control means for selecting the transmission speed ratio in a plurality of steps between the load and said motor mechanically coupled to the load, voltage producing means for supplying a control excitation to the generator field winding, and voltage control means for controlling the voltage output of said voltage producing means as a function of the transmission speed ratio selected for driving the load and at least one of a predetermined number of other factors of the drive system comprising the load and motors that affect the $WR^2$ value of the rotating parts of the drive system.

6. In an electric system of control for direct current dynamoelectric machines operative with a rotating load comprising an unwinding reel the speed of which varies from a selected relatively low value for a full coil to a selected higher value for an empty coil and the weight of which thus varies with the width of the strip and the amount of material on the reel mandrel, in combination, a direct current generator having a field winding the excitation of which is to be controlled, a plurality of direct current motors each having a field winding the excitation of which is to be controlled, coupling means for selectively connecting at least one of said motors in a loop circuit with said generator comprising a voltage supply, a voltage regulating device the output voltage of which controls the excitation of the generator field winding, a plurality of gear transmissions, with one of said gear transmissions being provided for each motor and including ganged shifting means in each gear transmission to selectively alter the transmission ratio between one of the motors and said load, a clutch between each motor and the load for coupling and decoupling the load from the latter motor whereby any particular motor not electrically connected to the supply may be selectively decoupled from the load, excitation control means for decreasing the excitation of the field windings of the motors selectively connected to said voltage supply with an increase in motor speed as a function of motor armature current and the terminal voltage of at least one motor, an inertia compensating control winding for the voltage regulating device, said inertia compensating control winding being energized as a function of the changes in field excitation of at least one motor field winding.

7. In an electric system of control for direct current dynamoelectric machines operative with a rotating load including an unwinding reel the speed of which, during normal use, varies from a selected relatively low value for a full coil to a selected higher value at an empty coil and the weight of which thus varies, during such normal use, with the width of the strip and the amount of material on the reel mandrel, in combination, a direct current generator having a field winding the excitation of which is to be controlled, a plurality of direct current motors each having a field winding the excitation of which is to be controlled, coupling means for selectively connecting at least one of said motors in a loop circuit with said generator comprising the voltage supply, a voltage regulating device the output voltage of which controls the excitation of the generator field winding, a plurality of gear transmissions, one of said transmissions being provided for each motor and including ganged shifting means in each transmission to selectively alter the transmission ratio between each of the motors and said load, a clutch between each motor and the load for coupling and decoupling the load from the latter motor whereby any motor not electrically connected to the voltage supply may be selectively decoupled from the load, excitation control means for decreasing the excitation of the field windings of each of the motors selectively connected to the supply to effect an increase in motor speed as a function of motor armature current and the terminal voltage of at least one motor, a load current responsive control winding for the voltage regulating device for increasing the output voltage of the regulating device to thus increase the counter voltage of the generator and to maintain the load current constant and thus keep constant the power generated by each motor supplying torque to the load, an inertia compensating control winding for the voltage regulating device, with said inertia compensating control winding being energized as a function of the changes in field excitation of at least one motor field winding.

8. In an electric system of control for direct current dynamoelectric machines, in combination, a direct current generator having a field winding the excitation of which is to be controlled, a direct current motor connected in a loop circuit with the generator and having a field winding the excitation of which is to be controlled, a voltage regulating device the output voltage of which controls the excitation of the generator field winding, said motor being coupled to an overhauling rotating load the speed of which, during normal use, varies from a selected relatively low value to a selected higher value and whose weight, during such normal use, varies from a selected high value to a selected lower value, means for decreasing the excitation of the motor field winding with an increase in motor speed as a function of motor armature current and motor terminal voltage, a first control winding for the voltage regulating device, responsive to motor armature current, for increasing the output voltage of the regulating device to thus increase the counter-voltage of the generator to maintain the motor armature current constant to thus keep the power generated by the motor substantially constant, an inertia compensating control winding for the voltage regulating device, said inertia compensating control winding being energized as a function of the changes in field excitation of the motor field winding, and means for also controlling the excitation of the inertia compensating winding as a function of the change in weight of the load.

9. In an electric system of control for direct current dynamoelectric machines, in combination, a direct current generator having a field winding the excitation of which is to be controlled, a direct current motor connected in a loop circuit with the generator and having a field winding the excitation of which is to be controlled, a voltage regulating device the output voltage of which controls the excitation of the generator field winding, said motor being coupled to an overhauling rotating load the speed of which, during normal use, varies from a selected relatively low value to a selected higher value and whose weight, during such normal use, varies from a selected high value to a selected lower value, means for decreasing the excitation of the motor field winding with an increase in motor speed as a function of motor armature current and motor terminal voltage, a first control winding for the voltage regulating device, responsive to motor armature current, for increasing the output voltage of the regulating device to thus increase the counter-voltage of the generator to maintain the motor armature current constant to thus keep the power generated by the motor substantially constant, an inertia compensating control winding for the voltage regulating device, said inertia compensating control winding being energized as a function of the changes in field excitation of the motor field winding, and means for also controlling the excitation of the inertia compensating winding as a function of the changes in motor field current.

10. In an electric system of control for direct current dynamoelectric machines, in combination, a direct current generator having a field winding the excitation of which is to be controlled, a direct current motor connected in a loop circuit with the generator and having a field winding the excitation of which is to be controlled, a voltage regulating device the output voltage of which controls the excitation of the generator field winding, said motor being coupled to an overhauling rotating load the speed of which, during normal use, varies from a selected relatively low value to a selected higher value and whose weight, during such normal use, varies from a selected high value to a selected lower value, means for decreasing the excitation of the motor field winding with an increase in motor speed as a function of motor armature current and motor terminal voltage, a first control winding for the voltage regulating device, responsive to motor armature current, for increasing the output voltage of the regulating device to thus increase the counter-voltage of the generator to maintain the motor armature current constant to thus keep the power generated by the motor substantially constant, an inertia compensating control winding for the voltage regulating device, said inertia compensating control winding being energized as a function of the changes in field excitation of the motor field winding, and means for controlling the excitation of the inertia compensating winding as a function of the changes in excitation of the motor, and means for also controlling the excitation of the inertia compensating windings as a function of the changes in weight of the load.

11. In an electric system of control for direct current dynamoelectric machines, in combination, a direct current generator having a field winding the excitation of which is to be controlled, a direct current motor connected in a loop circuit with the generator and having a field winding the excitation of which is to be controlled, a voltage regulating device the output voltage of which controls the excitation of the generator field winding, said motor being coupled to an overhauling rotating load the speed of which, during normal use, varies from a selected relatively low value to a selected higher value and whose weight, during such normal use, varies from a selected high value to a selected lower value, means for decreasing the excitation of the motor field winding with an increase in motor speed as a function of motor armature current and motor terminal voltage, a first control winding for the voltage regulating device, responsive to motor armature current, for increasing the output voltage of the regulating device to thus increase the counter-voltage of the generator to maintain the motor armature current constant to thus keep the power generated by the motor substantially constant, an inertia compensating control winding for the voltage regulating device, said inertia compensating control winding being energized as a function of the changes in field excitation of the motor field winding, the coupling between the motor and load being made through a transmission gear provided with means for selectively making the coupling at any one of a plurality of gear ratios, means for changing the excitation of the inertia compensating windings with changes in motor field excitation, and means for calibrating the excitation of the inertia compensating winding in accordance with the gear ratio selected for the coupling between the motor and the load.

12. In an electric system of control for direct current dynamoelectric machines, in combination, a direct current generator having a field winding the excitation of which is to be controlled, a direct current motor connected in a loop circuit with the generator and having a field winding the excitation of which is to be controlled, a voltage regulating device the output voltage of which controls the excitation of the generator field winding, said motor being coupled to an overhauling rotating load the speed of which, during normal use, varies from a selected relatively low value to a selected higher value and whose weight, during such normal use, varies from a selected high value to a selected lower value, means for decreasing the excitation of the motor field winding with an increase in motor speed as a function of motor armature current and motor terminal voltage, a first control winding for the voltage regulating device, responsive to motor armature current, for increasing the output voltage of the regulating device to thus increase the counter-voltage of the generator to maintain the motor armature current constant to thus keep the power generated by the motor substantially constant, an inertia compensating control winding for the voltage regulating device, said inertia compensating control winding being energized as a function of the changes in field excitation of the motor field winding, with a transmission gear and a cylindrical load coupled to the motor that may have any one of a plurality of selected lengths and in which the coupling between the motor and load is selectively made at any one of a plurality of gear ratios of the transmission gear, means for changing the excitation of the inertia compensating windings in accordance with the excitation of the motor field winding, means altering the excitation of the inertia compensating winding in accordance with the length of the particular load and means for calibrating the inertia compensation winding in accordance with the gear ratio selected for the coupling between motor and load.

13. In an electric system of control for direct current dynamoelectric machines operative with a rotating load comprising an unwinding reel the speed of which varies from a selected relatively low value for a full coil to a selected higher value for an empty coil and the weight of which thus varies with the width of the strip and the amount of material on the reel mandrel, in combination, a direct current generator having a field winding the excitation of which is to be controlled, a plurality of direct current motors each having a field winding the excitation of which is to be controlled, coupling means for selectively connecting at least one of said motors in a loop circuit with said generator comprising a voltage supply, a voltage regulating device the output voltage of which controls the excitation of the generator field winding, a plurality of gear transmissions, with one of said gear transmissions being provided for each motor and including ganged shifting means in each gear transmission to selectively alter the transmission ratio between one of the motors and said load, a clutch between each motor and the load for coupling and decoupling the load from the latter motor whereby any particular motor not electrically connected to the supply may be selectively decoupled from the load, excitation control means for decreasing the excitation of the field windings of the motors selectively connected to said voltage supply with an increase in motor speed as a function of motor armature current and the terminal voltage of at least one motor, an inertia compensating control winding for the voltage regulating device, said inertia compensating control winding being energized as a function of the changes in field excitation of at least one motor field winding, second excitation control means for altering the excitation of the inertia compensating control winding in accordance with the gear ratio selected for one driving transmission of the load.

14. In an electric system of control for direct current dynamoelectric machines operative with a rotating load comprising an unwinding reel the speed of which varies from a selected relatively low value for a full coil to a selected higher value for an empty coil and the weight of which thus varies with the width of the strip and the amount of material on the reel mandrel, in combination, a direct current generator having a field winding the excitation of which is to be controlled, a plurality of direct current motors each having a field winding the excitation of which is to be controlled, coupling means for selectively connecting at least one of said motors in a loop circuit with said generator comprising a voltage supply, a voltage regulating device the output voltage of which controls the excitation of the generator field winding, a plurality of gear transmissions, with one of said gear transmissions being provided for each motor and including ganged shifting means in each gear transmission to selectively alter the transmission ratio between one of the motors and said load, a clutch between each motor and the load for coupling and decoupling the load from the latter motor whereby any particular motor not electrically connected to the supply may be selectively decoupled from the load, excitation control means for decreasing the excitation of the field windings of the motors selectively connected to said voltage supply with an increase in motor speed as a function of motor armature current and the terminal voltage of at least one motor, an inertia compensating control winding for the voltage regulating device, said inertia compensating control winding being energized as a function of the changes in field excitation of at least one motor field winding, second excitation control means for altering the excitation of the inertia compensating winding in accordance with the width of the material being unwound.

15. In an electric system of control for direct current dynamoelectric machines operative with a rotating load comprising an unwinding reel the speed of which varies from a selected relatively low value for a full coil to a selected higher value for an empty coil and the weight of which thus varies with the width of the strip and the amount of material on the reel mandrel, in combination, a direct current generator having a field winding the excitation of which is to be controlled, a plurality of direct current motors each having a field winding the excitation of which is to be controlled, coupling means for selectively connecting at least one of said motors in a loop circuit with said generator comprising a voltage supply, a voltage regulating device the output voltage of which controls the excitation of the generator field winding, a plurality of gear transmissions, with one of said gear transmissions being provided for each motor and including ganged shifting means in each gear transmission to selectively alter the transmission ratio between one of the motors and said load, a clutch between each motor and the load for coupling and decoupling the load from the latter motor whereby any particular motor not electrically connected to the supply may be selectively decoupled from the load, excitation control means for decreasing the excitation of the field windings of the motors selectively connected to said voltage supply with an increase in motor speed as a function of motor armature current and the terminal voltage of at least one motor, an inertia compensating control winding for the voltage regulating device, said inertia compensating control winding being energized as a function of the changes in field excitation of at least one motor field winding, second excitation control means for altering the excitation of the inertia compensating winding in accordance with the number of motor armatures mechanically coupled to the load.

16. In an electric system of control for direct current dynamoelectric machines operative with a rotating load comprising an unwinding reel the speed of which varies from a selected relatively low value for a full coil to a selected higher value for an empty coil and the weight of which thus varies with the width of the strip and the amount of material on the reel mandrel, in combination, a direct current generator having a field winding the excitation of which is to be controlled, a plurality of direct current motors each having a field winding the excitation of which is to be controlled, coupling means for selectively connecting at least one of said motors in a loop circuit with said generator comprising a voltage supply, a voltage regulating device the output voltage of which controls the excitation of the generator field winding, a plurality of gear transmissions, with one of said gear transmissions being provided for each motor and including ganged shifting means in each gear transmission to selectively alter the transmission ratio between one of the motors and said load, a clutch between each motor and the load for coupling and decoupling the load from the latter motor whereby any particular motor not electrically connected to the supply may be selectively decoupled from the load, excitation control means for decreasing the excitation of the field windings of the motors selectively connected to said voltage supply with an increase in motor speed as a function of motor armature current and the terminal voltage of at least one motor, an inertia compensating control winding for the voltage regulating device, said inertia compensating control winding being energized as a function of the changes in field excitation of at least one motor field winding, second excitation control means for altering the excitation of the inertia compensating winding in accordance with the number of motors supplying torque to the load.

17. In an electric system of control for direct current dynamoelectric machines operative with a rotating load including an unwinding reel the speed of which, during normal use, varies from a selected relatively low value for a full coil to a selected higher value at an empty coil and the weight of which thus varies, during such normal use, with the width of the strip and the amount of material on the reel mandrel, in combination, a direct current generator having a field winding the excitation of which is to be controlled, a plurality of direct current motors each having a field winding the excitation of which is to be controlled, coupling means for selectively connecting at least one of said motors in a loop circuit with said generator comprising the voltage supply, a voltage regulating device the output voltage of which controls the excitation of the generator field winding, a plurality of gear transmissions, one of said transmissions being provided for each motor and including ganged shifting means in each transmission to selectively alter the transmission ratio between each of the motors and said load, a clutch between each motor and the load for coupling and decoupling the load from the latter motor whereby any motor not electrically connected to the voltage supply may be selectively decoupled from the load, excitation control means for decreasing the excitation of the field windings of each of the motors selectively connected to the supply to effect an increase in motor speed as a function of motor armature current and the terminal voltage of at least one motor, a load current responsive control winding for the voltage regulating device for increasing the output voltage of the regulating device to thus increase the counter voltage of the generator and to maintain the load current constant and thus keep constant the power generated by each motor supplying torque to the load, an inertia compensating control winding for the voltage regulating device, with said inertia compensating control winding being energized as a function of the changes in field excitation of at least one motor field winding, and means for altering the excitation of the inertia compensating control winding in accordance with the gear ratio selected for the driving transmission of the load.

18. In an electric system of control for direct current dynamoelectric machines operative with a rotating load including an unwinding reel the speed of which, during normal use, varies from a selected relatively low value for a full coil to a selected higher value at an empty coil and the weight of which thus varies, during such normal use, with the width of the strip and the amount of material on the reel mandrel, in combination, a direct current generator having a field winding the excitation of which is to be controlled, a plurality of direct current motors each having a field winding the excitation of which is to be controlled, coupling means for selectively connecting at least one of said motors in a loop circuit with said generator comprising the voltage supply, a voltage regulating device the output voltage of which controls the excitation of the generator field winding, a plurality of gear transmissions, one of said transmissions being provided for each motor and including ganged shifting means in each transmission to selectively alter the transmission ratio between each of the motors and said load, a clutch between each motor and the load for coupling and decoupling the load from the latter motor whereby any motor not electrically connected to the voltage supply may be selectively decoupled from the load, excitation control means for decreasing the excitation of the field windings of each of the motors selectively connected to the supply to effect an increase in motor speed as a function of motor armature current and the terminal voltage of at least one motor, a load current responsive control winding for the voltage regulating device for increasing the output voltage of the regulating device to thus increase the counter voltage of the generator and to maintain the load current constant and thus keep the power generated by each motor supplying torque to the load, an inertia compensating control winding for the voltage regulating device, with said inertia compensating control winding being energized as a function of the changes in field excitation of at least one motor field winding, and means for altering the excitation of the inertia compensating winding in accordance with the width of the material being unwound.

19. In an electric system of control for direct current dynamoelectric machines operative with a rotating load including an unwinding reel the speed of which, during normal use, varies from a selected relatively low value for a full coil to a selected higher value at an empty coil and the weight of which thus varies, during such normal use, with the width of the strip and the amount of material on the reel mandrel, in combination, a direct current generator having a field winding the excitation of which is to be controlled, a plurality of direct current motors each having a field winding the excitation of which is to be controlled, coupling means for selectively connecting at least one of said motors in a loop circuit with said generator comprising the voltage supply, a voltage regulating device the output voltage of which controls the excitation of the generator field winding, a plurality of gear transmissions, one of said transmissions being provided for each motor and including ganged shifting means in each transmission to selectively alter the transmission ratio between each of the motors and said load, a clutch between each motor and the load for coupling and decoupling the load from the latter motor whereby any motor not electrically connected to the voltage supply may be selectively decoupled from the load, excitation control means for decreasing the excitation of the field windings of each of the motors selectively connected to the supply to effect an increase in motor speed as a function of motor armature current and the terminal voltage of at least one motor, a load current responsive control winding for the voltage regulating device for increasing the output voltage of the regulating device to thus increase the counter voltage of the generator and to maintain the load current constant and thus keep constant the power generated by each motor supplying torque to the load, an inertia compensating control winding for the voltage regulating device, with said inertia compensating control winding being energized as a function of the changes in field excitation of at least one motor field winding, and means for altering the excitation of the inertia compensating winding in accordance with the number of motor armatures mechanically coupled to the load.

20. In an electric system of control for direct current dynamoelectric machines operative with a rotating load including an unwinding reel the speed of which, during normal use, varies from a selected relatively low value for a full coil to a selected higher value at an empty coil and the weight of which thus varies, during such normal use, with the width of the strip and the amount of material on the reel mandrel, in combination, a direct current generator having a field winding the excitation of which is to be controlled, a plurality of direct current motors each having a field winding the excitation of which is to be controlled, coupling means for selectively connecting at least one of said motors in a loop circuit with said generator comprising the voltage supply, a voltage regulating device the output voltage of which controls the excitation of the generator field winding, a plurality of gear transmissions, one of said transmissions being provided for each motor and including ganged shifting means in each transmission to selectively alter the transmission ratio between each of the motors and said load, a clutch between each motor and the load for coupling and decoupling the load from the latter motor whereby any motor not electrically connected to the voltage supply may be selectively decoupled from the load, excitation control means for decreasing the excitation of the field windings of each of the motors selectively connected to the supply to effect an increase in motor speed as a function of motor armature current and the terminal voltage of at least one motor, a load current responsive control winding for the voltage regulating device for increasing the output voltage of the regulating device to thus increase the counter voltage of the generator and to maintain the load current constant and thus keep constant the power generated by each motor supplying torque to the load, an inertia compensating control winding for the voltage regulating device, with said inertia compensating control winding being energized as a function of the changes in field excitation of at least one motor field winding, and means for altering the excitation of the inertia compensating winding in accordance with the number of motors supplying torque to the load.

21. In an electric system of control for direct current dynamoelectric machines operative with a rotating load comprising an unwinding reel the speed of which varies from a selected relatively low value for a full coil to a selected higher value for an empty coil and the weight of which thus varies with the width of the strip and the amount of material on the reel mandrel, in combination, a direct current generator having a field winding the excitation of which is to be controlled, a plurality of direct current motors each having a field winding the excitation of which is to be controlled, coupling means for selectively connecting at least one of said motors in a loop circuit with said generator comprising a voltage supply, a voltage regulating device the output voltage of which controls the excitation of the generator field winding, a plurality of gear transmissions, with one of said gear transmissions being provided for each motor and including ganged shifting means in each gear transmission to selectively alter the transmission ratio between one of the motors and said load, a clutch between each motor and the load for coupling and decoupling the load from the latter motor whereby any particular motor not electrically connected to the supply may be selectively decoupled from the load, excitation control means for decreasing the excitation of the field windings of the motors selectively connected to said voltage supply with an increase in motor speed as a function of motor armature current and the terminal voltage of at least one motor, an inertia compensating control winding for the voltage regulating device, said inertia compensating control winding being energized as a function of the changes in field excitation of at least one motor field winding, second excitation control means for altering the excitation of the inertia compensating control winding in accordance with the gear ratio selected for one driving transmission of the load, second excitation control means for altering the excitation of the inertia compensating winding in accordance with the width of the material being unwound.

22. In an electric system of control for direct current dynamoelectric machines operative with a rotating load comprising an unwinding reel the speed of which varies from a selected relatively low value for a full coil to a selected higher value for an empty coil and the weight of which thus varies with the width of the strip and the amount of material on the reel mandrel, in combination, a direct current generator having a field winding the excitation of which is to be controlled, a plurality of direct current motors each having a field winding the excitation of which is to be controlled, coupling means for selectively connecting at least one of said motors in a loop circuit with said generator comprising a voltage supply, a voltage regulating device the output voltage of which controls the excitation of the generator field winding, a plurality of gear transmissions, with one of said gear transmissions being provided for each motor and including ganged shifting means in each gear transmission to selectively alter the transmission ratio between one of the motors and said load, a clutch between each motor and the load for coupling and decoupling the load from the latter motor whereby any particular motor not electrically connected to the supply may be selectively decoupled from the load, excitation control means for decreasing the excitation of the field windings of the motors selectively connected to said voltage supply with an increase in motor speed as a function of motor armature current and the terminal voltage of at least one motor, an inertia compensating control winding for the voltage regulating device, said inertia compensating control winding being energized as a function of the changes in field excitation of at least one motor field winding, second excitation control means for altering the excitation of the inertia compensating control winding in accordance with the gear ratio selected for one driving transmission of the load, second excitation control means for altering the excitation of the inertia compensating winding in accordance with the number of motor armatures mechanically coupled to the load.

23. In an electric system of control for direct current dynamoelectric machines operative with a rotating load comprising an unwinding reel the speed of which varies from a selected relatively low value for a full coil to a selected higher value for an empty coil and the weight of which thus varies with the width of the strip and the amount of material on the reel mandrel, in combination, a direct current generator having a field winding the excitation of which is to be controlled, a plurality of direct current motors each having a field winding the excitation of which is to be controlled, coupling means for selectively connecting at least one of said motors in a loop circuit with said generator comprising a voltage supply, a voltage regulating device the output voltage of which controls the excitation of the generator field winding, a plurality of gear transmissions, with one of said gear transmissions being provided for each motor and including ganged shifting means in each gear transmission to selectively alter the transmission ratio between one of the motors and said load, a clutch between each motor and the load for coupling and decoupling the load from the latter motor whereby any particular motor not electrically connected to the supply may be selectively decoupled from the load, excitation control means for decreasing the excitation of the field windings of the motors selectively connected to said voltage supply with an increase in motor speed as a function of motor armature current and the terminal voltage of at least one motor, an inertia compensating control winding for the voltage regulating device, said inertia compensating control winding being energized as a function of the changes in field excitation of at least one motor field winding, second excitation control means for altering the excitation of the inertia compensating control winding in accordance with the gear ratio selected for one driving transmission of the load, second excitation control means for altering the excitation of the inertia compensating winding in accordance with the number of motors supplying torque to the load.

24. In an electric system of control for direct current dynamoelectric machines operative with a rotating load comprising an unwinding reel the speed of which varies from a selected relatively low value for a full coil to a selected higher value for an empty coil and the weight of which thus varies with the width of the strip and the amount of material on the reel mandrel, in combination, a direct current generator having a field winding the excitation of which is to be controlled, a plurality of direct current motors each having a field winding the excitation of which is to be controlled, coupling means for selectively connecting at least one of said motors in a loop circuit with said generator comprising a voltage supply, a voltage regulating device the output voltage of which controls the excitation of the generator field winding, a plurality of gear transmissions, with one of said gear transmissions being provided for each motor and including ganged shifting means in each gear transmission to selectively alter the transmission ratio between one of the motors and said load, a clutch between each motor and the load for coupling and decoupling the load from the latter motor whereby any particular motor not electrically connected to the supply may be selectively decoupled from the load, excitation control means for decreasing the excitation of the field windings of the motors selectively connected to said voltage supply with an increase in motor speed as a function of motor armature current and the terminal voltage of at least one motor, an inertia compensating control winding for the voltage regulating device, said inertia compensating control winding being energized as a function of the changes in field excitation of at least one motor field winding, second excitation control means for altering the excitation of the inertia compensating winding in accordance with the width of the material being unwound, second excitation control means for altering the excitation of the inertia compensating winding in accordance with the number of motor armatures mechanically coupled to the load.

25. In an electric system of control for direct current dynamoelectric machines operative with a rotating load comprising an unwinding reel the speed of which varies from a selected relatively low value for a full coil to a selected higher value for an empty coil and the weight of which thus varies with the width of the strip and the amount of material on the reel mandrel, in combination, a direct current generator having a field winding the excitation of which is to be controlled, a plurality of direct current motors each having a field winding the excitation of which is to be controlled, coupling means for selectively connecting at least one of said motors in a loop circuit with said generator comprising a voltage supply, a voltage regulating device the output voltage of which controls the excitation of the generator field winding, a plurality of gear transmissions, with one of said gear transmissions being provided for each motor and including ganged shifting means in each gear transmission to selectively alter the transmission ratio between one of the motors and said load, a clutch between each motor and the load for coupling and decoupling the load from the latter motor whereby any particular motor not electrically connected to the supply may be selectively decoupled from the load, excitation control means for decreasing the excitation of the field windings of the motors selectively connected to said voltage supply with an increase in motor speed as a function of motor armature current and the terminal voltage of at least one motor, an inertia compensating control winding for the voltage regulating device, said inertia compensating control winding being energized as a function of the changes in field excitation of at least one motor field winding, second excitation control means for altering the excitation of the inertia compensating control winding in accordance with the gear ratio selected for one driving transmission of the load, second excitation control means for altering the excitation of the inertia compensating winding in accordance with the width of the material being unwound, second excitation control means for altering the excitation of the inertia compensating winding in accordance with the number of motors supplying torque to the load.

26. In an electric system of control for direct current dynamoelectric machines operative with a rotating load comprising an unwinding reel the speed of which varies from a selected relatively low value for a full coil to a selected higher value for an empty coil and the weight of which thus varies with the width of the strip and the amount of material on the reel mandrel, in combination, a direct current generator having a field winding, the excitation of which is to be controlled, a plurality of direct current motors each having a field winding the excitation of which is to be controlled, coupling means for selectively connecting at least one of said motors in a loop circuit with said generator comprising a voltage supply, a voltage regulating device the output voltage of which controls the excitation of the generator field winding, a plurality of gear transmissions, with one of said gear transmissions being provided for each motor and including ganged shifting means in each gear transmission to selectively alter the transmission ratio between one of the motors and said load, a clutch between each motor and the load for coupling and decoupling the load from the latter motor whereby any particular motor not electrically connected to the supply may be selectively decoupled from the load, excitation control means for decreasing the excitation of the field windings of the motors selectively connected to said voltage supply with an increase in motor speed as a function of motor armature current and the terminal voltage of at least one motor, an inertia compensating control winding for the voltage regulating device, said inertia compensating control winding being energized as a function of the changes in field excitation of at least one motor field winding, second excitation control means for altering the excitation of the inertia compensating control winding in accordance with the gear ratio selected for one driving transmission of the load, second excitation control means for altering the excitation of the inertia compensating winding in accordance with the width of the material being unwound, second excitation control means for altering the excitation of the inertia compensating winding in accordance with the number of motor armatures mechanically coupled to the load, second excitation control means for altering the excitation of the inertia compensating winding in accordance with the number of motors supplying torque to the load.

References Cited in the file of this patent

UNITED STATES PATENTS

| 2,305,937 | Montgomery et al. | Dec. 22, 1942 |
| 2,569,287 | Burgwin et al. | Sept. 25, 1951 |
| 2,583,074 | Allbent et al. | Jan. 22, 1952 |
| 2,583,148 | Kimball et al. | Jan. 22, 1952 |
| 2,684,458 | Winchester | July 20, 1954 |
| 2,748,329 | Albert et al. | May 29, 1956 |

FOREIGN PATENTS

| 142,326 | Australia | July 19, 1951 |
| 953,288 | France | Dec. 2, 1949 |